US008586163B2

(12) United States Patent
Malm et al.

(10) Patent No.: US 8,586,163 B2
(45) Date of Patent: Nov. 19, 2013

(54) BETA-NUCLEATED PROPYLENE COPOLYMER

(75) Inventors: Bo Malm, Espoo (FI); Klaus Bernreitner, Linz (AT); Franz Ruemer, St. Georgen/Gusen (AT)

(73) Assignee: Borealis Technology Oy, Porvoo (FI)

( * ) Notice: Subject to any disclaimer, the term of this patent is extended or adjusted under 35 U.S.C. 154(b) by 503 days.

(21) Appl. No.: 12/734,367

(22) PCT Filed: Oct. 27, 2008

(86) PCT No.: PCT/EP2008/064513
§ 371 (c)(1),
(2), (4) Date: Apr. 27, 2010

(87) PCT Pub. No.: WO2009/056515
PCT Pub. Date: May 7, 2009

(65) Prior Publication Data
US 2010/0255236 A1 Oct. 7, 2010

(30) Foreign Application Priority Data
Nov. 2, 2007 (EP) ..................................... 07119850

(51) Int. Cl.
*B29D 22/00* (2006.01)
*B29D 23/00* (2006.01)
*B32B 1/08* (2006.01)

(52) U.S. Cl.
USPC ...... 428/36.91; 428/35.7; 428/36.9; 428/500; 526/348; 526/348.2; 526/348.4

(58) Field of Classification Search
USPC ............. 428/36.9, 36.91, 35.7, 500; 526/348, 526/348.2, 348.4
See application file for complete search history.

(56) References Cited

FOREIGN PATENT DOCUMENTS

| EP | 1 344 793 A1 | 9/2003 |
| EP | 1364986 A1 | 11/2003 |
| WO | WO 99/24479 A | 5/1999 |

OTHER PUBLICATIONS

Alcazar, Ruan, Thierry & Lotz; Structural Matching Between the Polymeric Necleatin Agent Isotactic Poly(vinylcyclohexane) and Isotactic Polypropylene; manuscript; Dec. 12, 2005; American Chemical Society.
Pasquini, Nello (Ed.), Product Technology Market, Polypropylene Handbook, 2nd Edition, 2005, pp. 314-317, Hanser Publishers, Munich, Hanser Gardner Publications, cincinnati.

*Primary Examiner* — Michael C Miggins
(74) *Attorney, Agent, or Firm* — Warn Partners, P.C.

(57) ABSTRACT

Heterophasic propylene copolymer (HECO) comprising wherein the heterophasic propylene copolymer (HECO) is β-nucleated and the elastomeric phase has an intrinsic viscosity measured in tetraline at 135° C. of equal or below 4.0 dl/g.

23 Claims, No Drawings

BETA-NUCLEATED PROPYLENE COPOLYMER

This application is a National Stage of International Application No. PCT/EP2008/064513, filed Oct. 27, 2008. This application claims priority to European Patent Application No. EP 07119850.1 filed on Nov. 2, 2007. The disclosures of the above applications are incorporated herein by reference.

The present invention relates to a new β-nucleated propylene copolymer, its manufacture and use as well as to pipes, layers in multilayer pipes and coatings on steel pipes comprising said new β-nucleated propylene copolymer.

Polypropylene-based polymers have many characteristics which make them suitable for many applications like cables, pipes, fittings, moulded articles, foams etc. Polypropylene as pipe material is mainly used in non-pressure applications, like for cable protection as well as for culverts (e.g. road and rail), fittings and profiles. All three main types of propylene polymers, i.e. homopolymers, random copolymers and block copolymers (i.e. heterophasic copolymers) are used.

In general, polypropylene-based materials to be chosen for pipe and cable applications should result in products of high impact performance as well as good stiffness while—if possible—still maintaining adequate pressure test performance. However, these properties are interrelated to each other and very often behave in a conflicting manner, i.e. improving a specific property can only be accomplished on the expense of another property.

Stiffness can be for instance improved by increasing the amount of homopolymer within the composition. As a consequence, the material becomes more brittle, thereby resulting in poor impact properties. Furthermore, high brittleness is usually accompanied by lower resistance to slow crack growth, thereby having a detrimental effect on durability.

On the other hand in case the impact resistance is of main interest heterophasic propylene copolymers might be a good choice. Heterophasic propylene copolymers, also referred to propylene block copolymers, comprise a polymer matrix with an elastomeric copolymer phase dispersed therein. The matrix is in general a propylene homopoylmer or copolymer. The elastomeric copolymer phase is often a propylene copolymer comprising ethylene and/or other higher α-olfin (s). It is known that with increase of comonomer content the impact behaviour can be improved. However this improvement is paid with an undesirable loss of stiffness. Irrespective form the general understanding as to how the individual properties are theoretically can be improved it is up to now not possible to prepare a well-balanced polymer composition with respect to stiffness and thoughness.

A major disadvantage of common polypropylene coatings or layers for pipes is the insufficient dynamic fracture toughness. However a high dynamic fracture toughness is required for pipes in order to avoid cracking of the coating or layer during installation handling and in service.

The term installation handling as used herein means any installation technique such as coiling and uncoiling of the ready made pipelines, welding and other jointing techniques and installation at the sea-bottom for off-shore installations with specially designed ships, most often to a depth of several hundreds of meters, also to uncertain sea bottom conditions with risk of rock impingements etc. Installation handling of coated steel pipes or multilayer pipes involves tough conditions for the coating and the layer, respectively, including high stress, substantial elongation, surface damages, notches, impact events etc, both at low and high temperature conditions and also at high hydrostatic pressure.

Accordingly there is still the need for polypropylene materials suitable for pipes with improved properties critical in this particular technical field.

Thus there is still the desire for instance for steel pipes with coatings or layers for multilayer pipes having an extraordinary impact performance at low temperatures. Of course the other properties needed for such coatings or layers shall not suffer from the improvement of impact performance.

Thus the object of the present invention is to provide a propylene copolymer with excellent impact resistance at low temperatures while keeping the other properties needed for coating materials of pipes, like steel pipes, or layers in multilayer pipes on standard. Thus it is in particular sought for a propylene copolymer with high impact resistance values at low temperatures (−20° C.) and good stiffness in terms of flexural modulus. Additionally such a propylene copolymer shall be preferably featured by a good pressure test performance. Moreover the object of the presnet invention is to provide pipes as steel pipes or multilayer pipes with a good impact performance at low temperatures, imparticular achieved by suitable coatings and layers, respectively.

The finding of the present invention is to provide a heterophasic propylene copolymer (HECO) being β-nucleated and having an elastomeric copolymer fraction with rather low molecular weight.

Thus the present invention is directed to an heterophasic propylene copolymer (HECO) comprising
(a) a propylene matrix (A) and
(b) an elastomeric copolymer (B) comprising propylene and at least one other $C_2$ to $C_{10}$ α-olefin
wherein
(c) the heterophasic propylene copolymer (HECO) is β-nucleated,
(d) optionally the heterophasic propylene copolymer (HECO) has a melt flow rat $MFR_2$ (230° C.) measured according to ISO 1133 of below 1.0 g/10 min, and
(e) the elastomeric copolymer (B) has an intrinsic viscosity measured in tetraline at 135° C. of equal or below 4.0 dl/g.

Preferably the propylene matrix (A) and the elastomeric copolymer (B) are the only polymer components in the heterophasic propylene copolymer (HECO).

The invention can be alternatively defined by an heterophasic propylene copolymer (HECO) comprising
(a) a propylene matrix (A) and
(b) an elastomeric copolymer (B) comprising propylene and at least one other $C_2$ to $C_{10}$ α-olefin
wherein
(c) the heterophasic propylene copolymer (HECO) is at least partially, preferably at least to 50%, crystallized in the β-modification,
(d) optionally the heterophasic propylene copolymer (HECO) has a melt flow rat $MFR_2$ (230° C.) measured according to ISO 1133 of below 1.0 g/10 min, and
(e) the elastomeric copolymer (B) has an intrinsic viscosity measured in tetraline at 135° C. of equal or below 4.0 dl/g.

Preferably the propylene matrix (A) and the elastomeric copolymer (B) are the only polymer components in the heterophasic propylene copolymer (HECO).

Surprisingly it has been found out that with said heterophasic propylene copolymer (HECO) the impact resistance at low temperatures, i.e. at −20° C., can be significantly improved compared to materials being state of the art (see tables 1 to 4). But not only the impact behavior at low temperatures is excellent but also the other properties can be kept on high levels. For instance the stiffness in terms of flexural modulus is comparable to known products. Moreover the material is featured by a rather low melting point compared to standard heterophasic propylene copolymers (HECOs) which improves also the processing properties of the inventive material.

The invention demands three requirements for the new propylene copolymer:
it must be a heterophasic propylene copolymer (HECO)
the heterophasic material must comprise an elastomeric copolymer phase of rather low molecular weight
the heterophasic material must be β-nucleated.
Further, the melt flow rate should be rather low.

In the following the mandatory requirements are described in more detail:

As stated above the propylene copolymer must be heterophasic. A heterophasic propylene copolymer (HECO) according to this invention contains beside propylene other α-olefine(s), for instance ethylene. Moreover such an heterophasic propylene copolymer (HECO) has preferably a multiphase structure with a polymer matrix and inclusions comprising at least an elastomeric phase, i.e. an amorphous propylene copolymer ("rubber"), and optionally a crystalline polyethylene. Normally such a heterophasic propylene copolymer (HECO) is obtained by carrying out a multi-stage process, like at least a two-stage process, resulting in such a heterophasic system.

The polymer matrix (A) of the heterophasic propylene copolymer (HECO) must be according to the invention a polypropylene matrix (A), which is in the following called propylene matrix (A).

The propylene matrix (A) can be a propylene homopolymer, a propylene copolymer, i.e. a random propylene copolymer, or mixtures thereof, like a homo/random copolymer. However it is preferred that the propylene matrix (A) is a propylene homopolymer.

The expression homopolymer used in the instant invention relates to a polypropylene that consists substantially, i.e. of at least 97 wt %, preferably of at least 98 wt %, more preferably of at least 99 wt %, still more preferably of at least 99.8 wt % of propylene units. In a preferred embodiment only propylene units in the propylene homopolymer are detectable. The comonomer content can be determined with FT infrared spectroscopy, as described below in the examples.

Even more preferred the propylene homopolymer is an isotactic propylene homopolymer. Thus it is preferred that the propylene homopolymer has a rather high pentad concentration, i.e. higher than 90%, more preferably higher than 92%, still more preferably higher than 93% and yet more preferably higher than 95%.

Where the propylene matrix (A) comprises a propylene copolymer, i.e. a random propylene copolymer, or is a homo/random propylene copolymer, the propylene copolymer comprises monomers copolymerizable with propylene, for example comonomers such as ethylene and $C_4$ to $C_{20}$ α-olefins, in particular ethylene and $C_4$ to $C_{10}$ α-olefins, e.g. 1-butene or 1-hexene. The comonomer content in the propylene matrix (A), i.e. in the random propylene copolymer, is in such a case preferably relatively low, i.e. up to 8.0 wt.-%, more preferably 2.5 to 8.0 wt.-%, still more preferably 2.5 to 7.5 wt.-%, yet more preferably 2.5 to 5.0 wt.-%.

The propylene matrix (A) can be unimodal or multimodal, like bimodal. However it is preferred that the propylene matrix (A) is unimodal. Concerning the definition of unimodal and multimodal, like bimodal, it is referred to the definition below.

Where the propylene matrix (A) comprises two or more different propylene polymers these may be polymers with different monomer make up and/or with different molecular weight distributions. These components may have identical or differing monomer compositions and tacticities.

Moreover it is preferred that the amount of xylene solubles of propylene matrix (A) is not too high. Xylene solubles are the part of the polymer soluble in cold xylene determined by dissolution in boiling xylene and letting the insoluble part crystallize from the cooling solution (for the method see below in the experimental part). The xylene solubles fraction contains polymer chains of low stereo-regularity and is an indication for the amount of non-crystalline areas. Accordingly it is preferred that the xylene solubles fraction of the propylene matrix (A) is less than 2.5 wt.-%, more preferably less than 2.0 wt.-%. In preferred embodiments the xylene solubles fraction is in the range of 0.2 to 2.5 wt.-% and more preferably in the range of 0.3 to 2.0 wt.-%.

It is further appreciated that the propylene matrix (A) has a rather low melt flow rate (MFR), i.e. a rather high molecular weight. The melt flow rate mainly depends on the average molecular weight. This is due to the fact that long molecules render the material a lower flow tendency than short molecules. An increase in molecular weight means a decrease in the MFR-value. The melt flow rate (MFR) is measured in g/10 min of the polymer discharged through a defined die under specified temperature and pressure conditions and the measure of viscosity of the polymer which, in turn, for each type of polymer is mainly influenced by its molecular weight but also by its degree of branching. The melt flow rate measured under a load of 2.16 kg at 230° C. (ISO 1133) is denoted as $MFR_2$ (230° C.). Accordingly, it is preferred that in the present invention the propylene matrix (A) has an $MFR_2$ (230° C.) below 8.00 g/10 min, more preferably below 2.0 g/10 min, still more preferably below 1.0 g/10 min, still yet more preferably below 0.8 g/10 min, like below 0.5 g/10 min.

In this context it is mentioned that the properties of the propylene matrix (A) can be for instance determined during the manufacture of the inventive heterophasic propylene copolymer (HECO). As stated above (and in further detail below) the heterophasic propylene copolymer can be obtained in a multistage process, wherein the propylene matrix (A) is produced first and in a subsequent step the elastomeric copolymer (B) in the presence of the matrix (A). Thus as the properties of the propylene matrix (A) do not significantly alter during the manufacture of the elastomeric copolymer (B) the first fraction can be determined before any subsequent step is accomplished.

As a further requirement of the heterophasic propylene copolymer (HECO) the elastomeric copolymer (B) must fulfil some properties so that the desired results can be achieved.

Accordingly the elastomeric copolymer (B) must comprise propylene and at least one other $C_2$ to $C_{10}$ α-olefin. Preferably the elastomeric copolymer (B) comprises, preferably consists of, propylene and at least one α-olefin comonomer selected form the group consisting of ethylene, 1-butene, 1-pentene, 1-hexene, 1-hepetene and 1-octene. Preferably the elastomeric copolymer (B) comprises at least propylene and ethylene and may comprise a further α-olefin as defined in this paragraph. However it is in particular preferred that the elastomeric copolymer (B) comprises, more preferably consists of, propylene and ethylene as the only polymerizable units. Thus an ethylene-propylene rubber (EPR) as elastomeric copolymer (B) is most preferred.

Like the propylene matrix (A) the elastomeric copolymer (B) can be unimodal or multimodal, like bimodal. However it is preferred that the elastomeric copolymer (B) is unimodal. Concerning the definition of unimodal and multimodal, like bimodal, it is referred to the definition below.

The elastomeric copolymer (B) is in particular featured by a relatively high amount of other $C_2$ to $C_{10}$ α-olefin than propylene. Thus it is appreciated that the propylene content of the elastomeric copolymer (B) is below 70 wt.-%, more preferably below 65 wt.-%, yet more preferably below 60 wt.-%, i.e. below 58 wt.-%. Accordingly the amount of the other $C_2$ to $C_{10}$ α-olefin(s), i.e. excluding propylene, in the elastomeric copolymer (B) is at least 30 wt.-%, more preferably at least 35 wt.-%, yet more preferably at least 40 wt.-%, i.e. at least 42 wt.-%. Preferred ranges for the other $C_2$ to $C_{10}$ α-olefin(s), i.e. excluding propylene, in the elastomeric copolymer (B) is 30 to 60 wt.-%, more preferably 35 to 55 wt.-%. Preferably the elastomeric copolymer (B) is an ethylene-propylene rubber (EPR), in particular with a propylene and/or ethylene content as defined in this paragraph.

A further important characteristic of the elastomeric copolymer (B) is its rather low intrinsic viscosity determined as the intrinsic viscosity of the acetone precipitated fraction of the xylene soluble fraction, IV of AM, i.e. being equal or below 4.0 dl/g, yet more preferably below 3.5 dl/g, still more preferably below 3.2 dl/g, still yet more preferably below 3.0 dl/g. In a preferred embodiment the intrinsic viscosity is in the range of 1.0 to 4.0 dl/g, still more preferred in the range of 1.5 to 3.0 dl/g. The intrinsic viscosity is measured according to ISO 1628 in tetraline at 135° C.

Finally it is required that the heterophasic propylene copolymer (HECO) must be β-nucleated, i.e. the polypropylene composition must be partially crystallized in the β-modification. Thus it is preferred that the amount of β-modification of the polypropylene composition is at least 50%, more preferably at least 60%, still more preferably at least 65%, like at least 70% (determined by DSC using the second heat as described in detail in the example section).

In addition the heterophasic propylene copolymer (HECO) comprises preferably also β-nucleating agents. The preferred β-nucleating agents are defined in more detail below where the process for the manufacture of the inventive heterophasic propylene copolymer (HECO) is described. The amount of β-nucleating agents is in the range of 0.0001 to 2.0 wt.-%, more preferably in the range of 0.0005 to 0.5 wt.-%, based on the heterophasic propylene copolymer (HECO).

Of course also the ratio of propylene matrix (A) and elastomeric copolymer (B) of the heterophasic propylene copolymer (HECO) has some influence on the desired properties. Thus it is preferred that the heterophasic propylene copolymer (HECO) comprises
(a) at least 65.0 wt.-%, more preferably at least 70.0 wt.-% and/or not more than 95.0 wt.-%, yet more preferably 65.0 to 92.0 wt.-%, still more preferably 72 to 90 wt.-%, of the propylene matrix (A) based on the total amount of the polymer components within the heterophasic propylene copolymer (HECO), more preferably based on the total amount of the heterophasic propylene copolymer (HECO),
(b) not more than 35.0 wt.-%, more preferably at least 5.0 wt.-% and/or not more than 30 wt.-%, yet more preferably 8.0 to 35.0 wt.-%, still more preferably 10.0 to 28.0 wt.-%, of the elastomeric copolymer (B) based on the total amount of the polymer components within the heterophasic propylene copolymer (HECO), more preferably based on the total amount of the heterophasic propylene copolymer (HECO).

Additionally it is appreciated that the overall content of the comonomers, i.e. α-olefins other than propylene, in the total heterophasic propylene copolymer (HECO) is rather moderate. Accordingly it is preferred that the heterophasic propylene copolymer (HECO) has an overall comonomer content, preferably ethylene content, of equal or below 20.0 wt.-%, more preferably of equal or below 15.0 wt.-%, yet more preferably equal or below 10.0 wt.-%.

Moreover it is appreciated that the $MFR_2$ (230° C.) of the heterophasic propylene copolymer (HECO) is rather low, i.e. below 1.0 g/10 min, more preferably below 0.7 g/10 min, yet more preferably below 0.5 g/10 min and still more preferably below 0.35 g/10 min.

Furthermore the heterophasic propylene copolymer (HECO) can be bimodal or multimodal. However it is preferred that the elastomeric copolymer (B) is multimodal, like bimodal The expression "multimodal" or "bimodal" used herein refers to the modality of the polymer, i.e. the form of its molecular weight distribution curve, which is the graph of the molecular weight fraction as a function of its molecular weight. As will be explained below, the polymer components of the present invention can be produced in a sequential step process, using reactors in serial configuration and operating at different reaction conditions. As a consequence, each fraction prepared in a specific reactor will have its own molecular weight distribution. When the molecular weight distribution curves from these fractions are superimposed to obtain the molecular weight distribution curve of the final polymer, that curve may show two or more maxima or at least be distinctly broadened when compared with curves for the individual fractions. Such a polymer, produced in two or more serial steps, is called bimodal or multimodal, depending on the number of steps.

The number average molecular weight (Mn) and the weight average molecular weight (Mw) as well as the molecular weight distribution (MWD) are determined in the instant invention by size exclusion chromatography (SEC) using Waters Alliance GPCV 2000 instrument with online viscometer. The oven temperature is 140° C. Trichlorobenzene is used as a solvent (ISO 16014). The exact measuring method is determined in the example section.

Furthermore it is appreciated that the heterophasic propylene copolymer (HECO) enables to provide pipes, in particular coatings of steel pipes or layers of multilayer pipes, having a rather high impact strength. Accordingly it is preferred that the heterophasic propylene copolymer (HECO) in an injection molded state and/or the pipes based on said polypropylene composition has/have an impact strength measured according the Charpy impact test (ISO 179 1eA (2000)) at −20° C. of at least 22.0 kJ/m², more preferably of at least 25.0 kJ/m², yet more preferably of at least 30.0 kJ/m².

Additionally it is appreciated that the heterophasic propylene copolymer (HECO) enables to provide pipes, in particular steel pipes, with a rather high resistance to deformation, i.e. a high stiffness. Accordingly it is preferred that the heterophasic propylene copolymer (HECO) in an injection molded state and/or the pipes based on said heterophasic propylene copolymer (HECO) has/have a flexural modulus measured according to ISO 178 of at least 900 MPa, more preferably of at least 1000 MPa, yet more preferably of at least 1100 Mpa.

Furthermore, the present invention is also directed the use of the inventive heterophasic propylene copolymer (HECO) for pipes, in particular steel pipes, or parts of a pipes. Preferably the inventive heterophasic propylene copolymer (HECO) is used as a coating layer for pipes, in particular steel pipes.

Moreover the present invention is also directed to pipes and/or pipe fittings, in particular steel pipes or multilayer pipes, comprising the heterophasic propylene copolymer (HECO) as defined in the instant invention. In particular the heterophasic propylene copolymer (HECO) according to this invention is applied as a coating layer for the pipes, in particular steel pipes, or as a layer in multilayer pipes. These pipes are in particular characterized by the flexural modulus and impact strength as defined in the previous paragraphs.

The term "pipe" as used herein is meant to encompass hollow articles having a length geater than diameter. Moreover the term "pipe" shall also encompass supplementary parts like fittings, valves and all parts which are commonly necessary for piping system.

The person skilled in the art readily notices that the inventive heterophasic propylene copolymer (HECO) can be used as foamed and/or skin layer in the above mentioned pipes.

The heterophasic propylene copolymer (HECO) used for pipes according to the invention may contain usual auxiliary materials, e.g. up to 10 wt.-% fillers and/or 0.01 to 2.5 wt.-% stabilizers and/or 0.01 to 1 wt.-% processing aids and/or 0.1 to 1 wt.-% antistatic agents and/or 0.2 to 3 wt.-% pigments and/or reinforcing agents, e.g. glass fibres, in each case based on the heterophasic propylene copolymer (HECO) used. In this respect, it has to be noted, however, that any of such of auxiliary materials which serve as highly active α-nucleating agents, such as certain pigments (e.g. phthalocyanine blue) and certain mineral fillers (e.g. talc), are not utilized in accordance with the present invention.

According to the present invention, there is also provided a process for the manufacture of the heterophasic propylene copolymer (HECO) discussed above. The elastomeric copolymer (B) may be blended with the propylene matrix (A) after their polymerizations and are subsequently β-nucleated. However, more desirably, the heterophasic propylene copolymer (HECO) is produced in a multistage process and subsequently β-nucleated. In a particular preferred embodiment the propylene matrix (A) is produced at least in one slurry reactor and subsequently the elastomeric copolymer (B) is produced at least in one gas phase reactor. Accordingly the heterophasic propylene copolymer (HECO) of the instant invention can be typically produced in a cascade of up to 4 reactors, where the first reactor is a liquid bulk reactor preferably of loop design and all subsequent reactors are gas phase reactors preferably of fluidized bed design. The components produced in the first two reactors are crystallizable propylene homopolymers or copolymers with a minor aimount of ethylene and/or other alpha-olefins (max. 8 wt.-%) (obtaining the matrix), while the component produced in the third reactor is a largely amorphous copolymer with higher amounts of comonomer and the component produced in the fourth reactor is either also a largely amorphous copolymer or a crystalline ethylene homo- or copolymer. According to a specific embodiment, only three reactors can be utilized with either the second reactor being bypassed or the fourth reactor not being utilized. According to another specific embodiment, only the first and the third reactor are utilized.

In the following a preferred process is described in more detail: Such a process for the manufacture of the present invention comprises the following steps:
(i) polymerizing propylene and optionally other α-olefin(s) in a first reactor system, preferably comprising a slurry reactor and optionally a gas phase reactor, to obtain a propylene matrix (A)
(ii) transferring the obtained propylene matrix (A) in a second reactor system,
preferably comprising at least one gas phase reactor,
(iii) polymerizing propylene and at least one other $C_2$ to $C_{10}$ α-olefin in said second reactor in the presence of the propylene matrix (A) to obtain an elastomeric copolymer (B),
(iv) mixing, in particular melt mixing, the obtained matrial with β-nucleating agents, in particular with 0.0001 to 2.0 wt.-% based on said composition of β-nucleating agents, at temperatures in the range of 175 to 300° C.
(v) cooling and crystallizing the β-nucleated heterophasic propylene copolymer (HECO).

The sequence (i) and (iii) can be reversed run, i.e. the elastomeric copolymer (B) can be produced first and subsequently the propylene matrix (A). However, it is preferred to have the sequence (i) to (iii) as stated above.

The comonomer feeds into the various reactors may be adapted to produce the heterophasic propylene copolymer (HECO) with the desired properties and the amounts of comonomer will be readily determined by the person skilled in the art.

By using—as stated above—a loop reactor and at least one gas phase reactor in serial configuration and working at different conditions, a multimodal (e.g. bimodal) propylene matrix (A) can be obtained.

Further details concerning the manufacture of heterophasic propylene copolymers (HECO) can be derived from WO 97/40080.

In such a procedure, the catalyst system used may be varied between stages but is preferably the same for all stages. Especially preferably a prepolymerized heterogeneous (i.e. supported) catalyst is used.

As a catalyst for the preparation of the heterophasic propylene copolymer (HECO) preferably a Ziegler-Natta catalyst system is used. Such Ziegler-Natta catalyst systems are known in the art and comprise a catalyst component, a cocatalyst component and an external donor. The catalyst component of the catalyst system primarily containing magnesium, titanium, halogen and an internal donor. Electron donors control the sterospecific properties and/or improve the activity of the catalyst system. A number of electron donors including ethers, esters, polysilanes, polysiloxanes, and alkoxysilanes are known in the art.

The catalyst preferably contains a transition metal compound as a procatalyst component. The transition metal compound is selected from the group consisting of titanium compounds having an oxidation degree of 3 or 4, vanadium compounds, zirconium compounds, cobalt compounds, nickel compounds, tungsten compounds and rare earth metal compounds, titanium trichloride and titanium tetrachloride being particularly preferred.

It is preferred to use catalysts which can withstand the high temperatures prevailing in the loop reactor. The conventional Ziegler-Natta catalysts for isotactic polymerization of propylene generally have an operating temperature limit of around 80° C., above which they either become deactivated or lose their stereo-selectivity. This low polymerization temperature may put a practical limit on the heat removal efficiency of the loop reactor.

One preferred catalyst to be used according to the invention is disclosed in EP 591 224 which discloses a method for preparing a procatalyst composition from magnesium dichloride, a titanium compound, a lower alcohol and an ester of phthalic acid containing at least five carbon atoms. According to EP 591 224, a transesterification reaction is carried out at an elevated temperature between the lower alcohol and the phthalic acid ester, whereby the ester groups from the lower alcohol and the phthalic ester change places.

Magnesium dichloride can be used as such or it can be combined with silica, e.g. by absorbing the silica with a solution or slurry containing magnesium dichloride. The lower alcohol used may preferably be methanol or ethanol, particularly ethanol.

The titanium compound used in the preparation of the procatalyst is preferably an organic or inorganic titanium compound, which is at the oxidation state of 3 or 4. Also other transition metal compounds, such as vanadium, zirconium, chromium, molybdenum and tungsten compounds can be mixed with the titanium compound. The titanium compound usually is a halide or oxyhalide, an organic metal halide, or a purely metal organic compound in which only organic ligands have been attached to the transition metal. Particularly preferred are the titanium halides, especially titanium tetrachloride.

The alkoxy group of the phthalic acid ester used comprises at least five carbon atoms, preferably at least eight carbon atoms. Thus, as the ester may be used e.g. propylhexyl phthalate, dioctyl phthalate, di-isodecyl phthalate and ditridecyl phthalate. The molar ratio of phthalic acid ester and magnesium halide is preferably about 0.2:1.

The transesterification can be carried out, e.g. by selecting a phthalic acid ester—a lower alcohol pair, which spontaneously or by the aid of a catalyst, which does not damage the procatalyst composition, transesterifies the catalyst at an elevated temperature. It is preferred to carry out the transesterification at a temperature which is 110 to 115° C., preferably 120 to 140° C.

The catalyst is used together with an organometallic cocatalyst and with an external donor. Generally, the external donor has the formula $$R_n R'_m Si(R''O)_{4-n-m}$$

wherein
R and R' can be the same or different and represent a linear, branched or cyclic aliphatic, or aromatic group;
R'' is methyl or ethyl;
n is an integer of 0 to 3;
m is an integer of 0 to 3; and
n+m is 1 to 3.

In particular, the external donor is selected from the group consisting of cyclohexyl methylmethoxy silane (CHMMS), dicyclopentyl dimethoxy silane (DCPDMS), diisopropyl dimethoxy silane, di-isobutyl dimethoxy silane, and di-t-butyl dimethoxy silane.

An organoaluminium compound is used as a cocatalyst. The organoaluminium compound is preferably selected from the group consisting of trialkyl aluminium, dialkyl aluminium chloride and alkyl aluminium sesquichloride.

According to the invention, such catalysts are typically introduced into the first reactor only. The components of the catalyst can be fed into the reactor separately or simultaneously or the components of the catalyst system can be precontacted prior to the reactor.

Such precontacting can also include a catalyst prepolymerization prior to feeding into the polymerization reactor proper. In the prepolymerization, the catalyst components are contacted for a short period with a monomer before feeding to the reactor.

As described above, after the manufacture of the heterophasic propylene copolymer (HECO) a β-nucleation step follows. As β-nucleating agent any nucleating agent can be used which is suitable for inducing crystallization of polypropylene homo- and copolymers in the hexagonal or pseudohexagonal modification. Mixtures of such nucleating agents may also be employed.

Suitable types of β-nucleating agents are
dicarboxylic acid derivative type diamide compounds from $C_5$ to $C_8$-cycloalkyl monoamines or $C_6$ to $C_{12}$-aromatic monoamines and $C_5$ to $C_8$-aliphatic, $C_5$ to $C_8$-cycloaliphatic or $C_6$ to $C_{12}$-aromatic dicarboxylic acids, e. g.

N,N'-di-$C_5$-$C_8$-cycloalkyl-2,6-naphthalene dicarboxamide compounds such as N,N'-dicyclohexyl-2,6-naphthalene dicarboxamide and N,N'-dicyclooctyl-2,6-naphthalene dicarboxamide, N,N-di-$C_5$-$C_8$-cycloalkyl-4,4-biphenyldicarboxamide compounds such as N,N'-dicyclohexyl-4,4-biphenyl-dicarboxamide and N,N'-dicyclopentyl-4,4-biphenyldicarboxamide, N,N'-di-$C_5$-$C_8$-cycloalkyl-terephthalamide compounds such as N,N'-dicyclohexylterephthalamide and N,N'-dicyclopentylterephthalamide, N,N'-di-$C_5$-$C_8$-cycloalkyl-1,4-cyclohexanedicarboxamide compounds such as N,N'-dicyclo-hexyl-1,4-cyclohexanedicarboxamide and N,N'-dicyclohexyl-1,4-cyclopentanedicarboxamide, diamine derivative type diamide compounds from $C_5$-$C_8$-cycloalkyl monocarboxylic acids or $C_6$-$C_{12}$-aromatic monocarboxylic acids and $C_5$-$C_8$-cycloaliphatic or $C_6$-$C_{12}$— aromatic diamines, e. g.

N,N—$C_6$-$C_{12}$-arylene-bis-benzamide compounds such as N,N'-p-phenylene-bis-benzamide and N,N'-1,5-naphthalene-bis-benzamide, N,N'—$C_5$-$C_8$-cycloalkyl-bis-benzamide compounds such as N,N'-1,4-cyclopentane-bis-benzamide and N,N'-1,4-cyclohexane-bis-benzamide, N,N-p-$C_6$-$C_{12}$-arylene-bis-$C_5$-$C_8$-cycloalkylcarboxamide compounds such as N,N'-1,5-naphthalene-bis-cyclohexanecarboxamide and N,N'-1,4-phenylene-bis-cyclohexanecarboxamide, and N,N'—$C_5$-$C_8$-cycloalkyl-bis-cyclohexanecarboxamide compounds such as N,N'-1,4-cyclopentane-bis-cyclohexanecarboxamide and N,N'-1,4-cyclohexane-bis-cyclohexanecarboxamide, amino acid derivative type diamide compounds from amidation reaction of $C_5$-$C_8$-alkyl, $C_5$-$C_8$-cycloalkyl- or $C_6$-$C_{12}$-arylamino acids, $C_5$-$C_8$-alkyl-, $C_5$-$C_8$-cycloalkyl- or $C_6$-$C_{12}$-aromatic monocarboxylic acid chlorides and $C_5$-$C_8$-alkyl-, $C_5$-$C_8$-cycloalkyl- or $C_6$-$C_{12}$-aromatic mono-amines, e.g.

N-phenyl-5-(N-benzoylamino)pentaneamide and N-cyclohexyl-4-(N-cyclohexyl-carbonylamino)benzamide.

Further suitable of β-nucleating agents are quinacridone type compounds, e.g. quinacridone, dimethylquinacridone and dimethoxyquinacridone, quinacridonequinone type compounds, e. g. quinacridonequinone, a mixed crystal of 5,12-dihydro(2,3b)acridine-7,14-dione with quino(2,3b)acridine-6,7,13,14-(5H,12H)-tetrone and dimethoxyquinacridonequinone and dihydroquinacridone type compounds, e. g. dihydroquinacridone, dimethoxydihydroquinacridone and dibenzodihydroquinacridone.

Still further suitable β-nucleating agents are dicarboxylic acid salts of metals from group IIa of periodic system, e. g. pimelic acid calcium salt and suberic acid calcium salt; and mixtures of dicarboxylic acids and salts of metals from group IIa of periodic system.

Still further suitable β-nucleating agents are salts of metals from group IIa of periodic system and imido acids of the formula

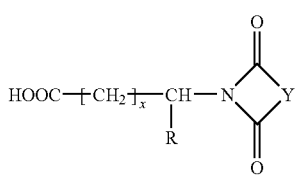

wherein x=1 to 4; R=H, —COOH, $C_1$-$C_{12}$-alkyl, $C_5$-$C_8$-cycloalkyl or $C_6$-$C_{12}$-aryl, and Y=$C_1$-$C_{12}$-alkyl, $C_5$-$C_8$-cycloalkyl or $C_6$-$C_{12}$-aryl-substituted bivalent $C_6$-$C_{12}$-aromatic residues, e. g.

calcium salts of phthaloylglycine, hexahydrophthaloylglycine, N-phthaloylalanine and/or N-4-methylphthaloylglycine.

Preferred β-nucleating agents are any one or mixtures of N,N'-dicyclohexyl-2,6-naphthalene dicarboxamide, quinacridone type or pimelic acid calcium-salt (EP 0 682 066).

In case pipes shall be produced of the inventive polypropylene composition than after the manufacture of the inventive polypropylene composition further steps follow. In general the inventive polypropylene composition is extruded and subsequently formed into a pipe, pipe layer or surrounds the steel pipe as it is known to a person skilled in the art.

Keeping the above considerations in mind, the following embodiments are especially preferred:

Paragraph [001] Heterophasic propylene copolymer (HECO) comprising
(a) a propylene matrix (A) and
(b) an elastomeric copolymer (B) comprising propylene and at least one other $C_2$ to $C_{10}$ α-olefin
wherein
(c) the heterophasic propylene copolymer (HECO) is β-nucleated, and
(d) said elastomeric copolymer (B) has an intrinsic viscosity measured in tetraline at 135° C. of equal or below 4.0 dl/g.

Paragraph [002] Heterophasic propylene copolymer (HECO) according to paragraph [001], wherein the heterophasic propylene copolymer (HECO) is partially crystallized in the β-modification.

Paragraph [003] Heterophasic propylene copolymer (HECO) according to paragraph [001] or [002], wherein the amount of β-modification of the heterophasic propylene (HECO) copolymer is at least 50%.

Paragraph [004] Heterophasic propylene copolymer (HECO) according to anyone of the preceding paragraphs [001] to [003], wherein the xylene soluble fraction of the propylene matrix (A) is below 2.5 wt.-%.

Paragraph [005] Heterophasic propylene copolymer (HECO) according to anyone of the preceding paragraphs [001] to [004], wherein the propylene matrix (A) is a propylene homopolymer.

Paragraph [006] Heterophasic propylene copolymer (HECO) according to anyone of the preceding paragraphs [001] to [005], wherein the elastomeric copolymer (B) is unimodal.

Paragraph [007] Heterophasic propylene copolymer (HECO) according to anyone of the preceding paragraphs [001] to [006], wherein the elastomeric copolymer (B) comprises propylene and at least one other $C_2$ to $C_{10}$ α-olefin selected from the group consisting of ethylene, 1-butene, 1-pentene, 1-hexene, 1-heptene and 1-octene.

Paragraph [008] Heterophasic propylene copolymer (HECO) according to anyone of the preceding paragraphs [001] to [007], wherein the elastomeric copolymer (B) comprises ethylene.

Paragraph [009] Heterophasic propylene copolymer (HECO) according to anyone of the preceding paragraphs [001] to [008], wherein the elastomeric copolymer (B) comprises propylene and ethylene as the only two α-olefins.

Paragraph [010] Heterophasic propylene copolymer (HECO) according to anyone of the preceding paragraphs [001] to [009], wherein the elastomeric copolymer (B) has a propylene content of equal or below 70 wt.-%.

Paragraph [011] Heterophasic propylene copolymer (HECO) according to anyone of the preceding paragraphs [001] to [010], wherein the elastomeric copolymer (B) is an ethylene propylene rubber (EPR).

Paragraph [012] Heterophasic propylene copolymer (HECO) according to anyone of the preceding paragraphs [001] to [011], wherein the comonomer content of the heterophasic propylene copolymer (HECO) is below 20.0 wt.-% (comonomer/(comonomer+propylene)).

Paragraph [013] Heterophasic propylene copolymer (HECO) according to anyone of the preceding paragraphs [001] to [012], wherein the heterophasic propylene copolymer (HECO) has a melt flow rat $MFR_2$ (230° C.) measured according to ISO 1133 of below Paragraph [014] Heterophasic propylene copolymer (HECO) according to anyone of the preceding paragraphs [001] to [013], wherein the heterophasic propylene copolymer (HECO) has an impact strength measured according the Charpy impact test (ISO 179 (1eA)) at −20° C. of at least 22.0 $kJ/m^2$.

Paragraph [015] Heterophasic propylene copolymer (HECO) according to anyone of the preceding paragraphs [001] to [014], wherein the heterophasic propylene copolymer (HECO) has a flexural modulus measured according to ISO 178 of at least 1000 MPa.

Paragraph [016] Heterophasic propylene copolymer (HECO) according to anyone of the preceding paragraphs [001] to [015], wherein the heterophasic propylene copolymer (HECO) is multimodal.

Paragraph [017] Heterophasic propylene copolymer according to anyone of the preceding paragraphs [001] to [016], wherein the heterophasic propylene copolymer (HECO) is a coating layer of a pipe, in particular a steel pipe.

Paragraph [018] Use of a heterophasic propylene copolymer (HECO) according to any one of the preceding paragraphs [001] to [017] for pipes or parts of pipes.

Paragraph [019] Use according to paragraph [018], wherein the pipe is a steel pipe or a multilayer pipe.

Paragraph [020] Use according to paragraph [018] or [019], wherein the heterophasic propylene copolymer (HECO) according to any one of the preceding paragraphs [001] to [014] is used as a coating layer for pipes, in particular steel pipes, or as a layer in multilayer pipes.

Paragraph [021] Method for producing an heterophasic propylene copolymer (HECO) according to any one of the preceding paragraphs [001] to [017] comprising the steps of
(a) polymerizing propylene and optionally further comonomer(s) to obtain the propylene matrix (A),
(b) polymerizing propylene and further comonomer(s) to obtain the elastomeric propylene copolymer (B)
(c) mixing propylene matrix (A) and the elastomeric propylene copolymer (B)
(d) β-nucleating said mixture.

Paragraph [022] Method according to paragraph [021], wherein the method comprises the steps
(a) polymerizing propylene and optionally further comonomer(s) in at least one reactor to obtain the propylene matrix (A)

(b) transferring said propylene matrix (A) in a further reactor
(c) polymerizing propylene and further comonomer(s) in the presence of said propylene matrix (A) to obtain the elastomeric propylene copolymer (B)
(d) β-nucleating said mixture.

Paragraph [023] Pipe, in particular steel pipe or multilayer pipe, comprising a heterophasic propylene copolymer (HECO) according to any one of the preceding paragraphs [001] to [017].

Paragraph [024] Pipe according to paragraph [023], wherein the heterophasic propylene copolymer (HECO) is a coating layer of the (steel) pipe or a layer of the multilayer pipe.

The present invention will now be described in further detail by the examples provided below.

EXAMPLES

1. Definitions/Measuring Methods

The following definitions of terms and determination methods apply for the above general description of the invention as well as to the below examples unless otherwise defined.

Number average molecular weight ($M_n$), weight average molecular weight ($M_w$) and molecular weight distribution (MWD) are determined by Gel Permeation Chromatography (GPC) according to the following method:

The weight average molecular weight Mw and the molecular weight distribution (MWD=Mw/Mn wherein Mn is the number average molecular weight and Mw is the weight average molecular weight) is measured by a method based on ISO 16014-1:2003 and ISO 16014-4:2003. A Waters Alliance GPCV 2000 instrument, equipped with refractive index detector and online viscosimeter was used with 3×TSK-gel columns (GMHXL-HT) from TosoHaas and 1,2,4-trichlorobenzene (TCB, stabilized with 200 mg/L 2,6-Di tert butyl-4-methyl-phenol) as solvent at 145° C. and at a constant flow rate of 1 mL/min. 216.5 μL of sample solution were injected per analysis. The column set was calibrated using relative calibration with 19 narrow MWD polystyrene (PS) standards in the range of 0.5 kg/mol to 11 500 kg/mol and a set of well characterised broad polypropylene standards. All samples were prepared by dissolving 5-10 mg of polymer in 10 mL (at 160° C.) of stabilized TCB (same as mobile phase) and keeping for 3 hours with continuous shaking prior sampling in into the GPC instrument.

NMR-Spectroscopy Measurements:

The $^{13}$C-NMR spectra of polypropylenes were recorded on Bruker 400 MHz spectrometer at 130° C. from samples dissolved in 1,2,4-trichlorobenzene/benzene-d6 (90/10 w/w). For the pentad analysis the assignment is done according to the methods described in literature: (T. Hayashi, Y. Inoue, R. Chüjö, and T. Asakura, Polymer 29 138-43 (1988).and Chujo R, et al, Polymer 35 339 (1994).

The NMR-measurement was used for determining the mmmm pentad concentration in a manner well known in the art.

$MFR_2$ is measured according to ISO 1133 (230° C., 2.16 kg load).

Comonomer content of C2 and C4 (or higher α-olefin(s)) is measured with Fourier transform infrared spectroscopy (FTIR) calibrated with $^{13}$C-NMR. When measuring the ethylene content in polypropylene, a thin film of the sample (thickness about 250 mm) was prepared by hot-pressing. The area of —$CH_2$— absorption peak (800-650 cm$^{-1}$) was measured with Perkin Elmer FTIR 1600 spectrometer. The method was calibrated by ethylene content data measured by $^{13}$C-NMR.

Content of β-modification: The β-crystallinity is determined by Differential Scanning Calorimetry (DSC). DSC is run according to ISO 3146/part 3/method C2 with a scan rate of 10° C./min. The amount of β-modification is calculated from the second heat by the following formula:

$$\beta\text{-area}/(\alpha\text{-area}+\beta\text{-area})$$

Since the thermodynamical β-modification starts to be changed into the more stable α-modification at temperatures above 150° C., a part of the β-modification is transferred within the heating process of DSC-measurement. Therefore, the amount of β-pp determined by DSC is lower as when measured according to the method of Turner-Jones by WAXS (A. Turner-Jones et. al., Makromol. Chem 75 (1964) 134). "Second heat" means that the sample is heated according to ISO 3146/part 3/method C2 for a first time and then cooled to room temperature at a rate of 10° C./min. The sample is then heated a second time, also according to ISO 3146/part 3/method C2. This second heat is relevant for measurement and calculation.

During the "first heat" all thermal history of the sample giving rise to different crystalline structure, which typically comes from different processing conditions and/or methods, is destroyed. Using the second heat for determination of β-crystallinity, it is possible to compare samples regardless of the way the samples were originally manufactured.

The xylene solubles (XS, wt.-%): Analysis according to the known method (ISO 6427): 2.0 g of polymer is dissolved in 250 ml p-xylene at 135° C. under agitation. After 30±2 minutes the solution is allowed to cool for 15 minutes at ambient temperature (21° C.) and then allowed to settle for 30 minutes at 25±0.5° C. The solution is filtered and evaporated in nitrogen flow and the residue dried under vacuum at 90° C. until constant weight is reached.

$$XS\% = (100 \times m_1 \times v_0)/(m_0 \times v_1), \text{ wherein}$$

$m_0$=initial polymer amount (g)
$m_1$=weight of residue (g)
$v_0$=initial volume (ml)
$v_1$=volume of analyzed sample (ml)

Amorphous Rubber Fraction of the Xylene Solubles (AM)

2.0 g of polymer is dissolved in 250 ml p-xylene at 135° C. under nitrogen. After 30+/−2 minutes the solution is allowed to cool for 15 minutes at ambient temperature and then allowed to settle for 30 minutes at 25+/−0.5° C. The solution is filtered with filter paper into two 100 ml flasks. The solution from one of the two 100 ml flasks is treated with 200 ml of acetone under vigorous stirring. The precipitate is filtered and dried in a vacuumoven at 90° C.

$$AM(\%) = (100 \times m_2 \times v_0)/(m_0 \times v_1)$$

$m_0$=initial polymer amount (g)
$m_2$=weight of precipitate (g)
$v_0$=initial volume (ml)
$v_1$=volume of analyzed sample (ml)

Intrinsic viscosity is measured according to DIN ISO 1628/1, October 1999 (in Tetraline at 135° C.).

Charpy impact strength was determined according to ISO 179 1eA (2000) on V-notched samples at 23° C. (Charpy impact strength (23° C.)) and −20° C. (Charpy impact strength (−20° C.)) by using injection moulded test specimens as described in EN ISO 1873-2 (80×10×4 mm)

Flexural modulus was measured according to ISO 178 (room temperature, if not otherwise mentioned) by using injection moulded test specimens as described in EN ISO 1873-2 (80×10×4 mm).

Preparation of the Examples

The heterophasic propylene copolymers (HECO) were produced according to table 1 in a Borstar PP pilot plant or in Spheripol pilot plant. As a catalyst one has been used as defined in EP 0 491 566 A2; EP 0 591 224 B1 or EP 0 586 390 B1 (Ti=1.9 wt.-%). Afterwards the heterophasic propylene copolymers (HECO) were compounded at a twin screw extruder at 270 to 300° C. all with the same formulation as stated below. The reference material BE60 is a Borealis commercial β-nucleated material for pipe extrusion (β-nucleation with the same formulation as defined below).

Formulation used: 1000 ppm Irganox 168; 2000 ppm Irganox 1010; 5000 ppm Irganox 1330; 700 ppm calcium stearate and 2 w.-% master batch based on pigmented propylene copolymer with 0.25 wt.-% Cinquasia Gold (quinacridone type β-nucleator).

All additives are products of Ciba Speciality Chemical, Switzerland.

TABLE 1

Properties of the materials

| Product name | | IE 1 | CE 1 | BE60 |
|---|---|---|---|---|
| Donor type | | DCPDMS | DCPDMS | |
| TEA/Ti ratio | [mol/mol] | 200 | 200 | |
| TEA/donor ratio | [mol/mol] | 8 | 8 | |
| Loop | | | | |
| Temperature | [° C.] | 85 | 85 | |
| Pressure | [kPa] | 5500 | 5500 | |
| H2/C3 ratio | [mol/kmol] | 0.20 | 0.30 | |
| Split | [%] | 50 | 50 | |
| MFR$_2$ | [g/10 min] | 0.22 | 0.35 | |
| XS | [w %] | 1.6 | 1.6 | 2.7 |
| GPR1 | | | | |
| Temperature | [° C.] | 85 | 85 | |
| Pressure | [kPa] | 3300 | 3300 | |
| H2/C3 ratio | [mol/kmol] | 0.90 | 1.50 | |
| Split | [%] | 50 | 50 | |
| MFR$_2$ | [g/10 min] | 0.21 | 0.37 | |
| XS | [wt.-%] | 1.5 | 0.9 | |
| GPR 2 | | | | |
| Temperature | [° C.] | 70 | 70 | |
| Pressure | [kPa] | 1800 | 1800 | |
| C2/C3 ratio | [mol/kmol] | 800 | 500 | |
| H2/C2 ratio | [mol/kmol] | 250 | 15 | |
| Split | [%] | 13 | 14 | |
| Final powder | | | | |
| MFR$_2$ | [g/10 min] | 0.22 | 0.22 | |
| Rubber composition XS | [wt.-%] | 11.7 | 3.6 | |
| viscosity of XS | [dl/g][tetraline] | 2.8 | 4.4 | |
| propene content | [wt.-%] | 56 | 61.7 | |
| C2 content | [wt.-%] | 6 | 5.1 | |
| Pellet MFR$_2$ | [g/10 min] | 0.21 | 0.26 | 0.2 |

TABLE 2

Properties of the materials

| Product name | | IE 2 | CE 2 |
|---|---|---|---|
| Donor type | | DCPDMS | DCPDMS |
| TEA/Ti ratio | [mol/mol] | 0.2 | 0.2 |
| TEA/donor ratio | [mol/mol] | 4 | 4 |
| Loop | | | |
| Temperature | [° C.] | 65 | 65 |
| Pressure | [kPa] | 3400 | 3400 |
| H2/C3 ratio | [mol/kmol] | 300 | 370.00 |
| Split | [%] | 87 | 86 |
| MFR$_2$ | [g/10 min] | 0.23 | 0.37 |
| XS | [w %] | 1.1 | 0.9 |
| GPR1 | | | |
| Temperature | [° C.] | | |
| Pressure | [kPa] | | |
| H2/C3 ratio | [mol/kmol] | | |
| Split | [%] | | |
| MFR$_2$ | [g/10 min] | | |
| XS | [wt.-%] | | |
| GPR 2 | | | |
| Temperature | [° C.] | 80 | 80 |
| Pressure | [kPa] | 950 | 1200 |
| C2/C3 ratio | [mol/kmol] | 0.55 | 0.45 |
| H2/C2 ratio | [mol/kmol] | 7.0 | 1.3 |
| Split | [%] | 13 | 14 |
| Final powder | | | |
| MFR$_2$ | [g/10 min] | 0.23 | 0.23 |
| Rubber composition XS | [wt.-%] | 11.5 | 13.4 |
| viscosity of XS | [dl/g][tetraline] | 2.9 | 4.7 |
| propene content | [wt.-%] | 47.5 | 56 |
| C2 content | [wt.-%] | 8.1 | 6.5 |
| Pellet MFR$_2$ | [g/10 min] | 0.21 | 0.23 |

TABLE 3

End Properties of the materials

| Product name | | IE 1 | CE 1 | BE60 |
|---|---|---|---|---|
| Tm | [° C.] | 153/171 | 153/171 | 153/168 |
| Beta content | [%] | 81.7 | 82 | 81 |
| Injection molding | | | | |
| Flexural modulus | [MPa] | 1120 | 1100 | 1370 |
| NIS | [23° C.] [kJ/m$^2$] | 126 | 122 | 77 |
| NIS | [0° C.] [kJ/m$^2$] | 80 | 70 | 8.1 |
| NIS | [−20° C.] [kJ/m$^2$] | 31.6 | 20.7 | 7.9 |

TABLE 4

End Properties of the materials

| Product name | | IE 2 | CE 2 |
|---|---|---|---|
| Tm | [° C.] | 153/171 | 153/171 |
| Beta content | [%] | 81.5 | 82.1 |
| Injection molding | | | |
| Flexural modulus | [MPa] | 1160 | 1110 |
| NIS | [23° C.] [kJ/m$^2$] | 115 | 123 |
| NIS | [0° C.] [kJ/m$^2$] | 79 | 50 |
| NIS | [−20° C.] [kJ/m$^2$] | 31.2 | 20.2 |

We claim:
1. Heterophasic propylene copolymer (HECO) comprising
(a) a propylene matrix (A) and
(b) an elastomeric copolymer (B) comprising propylene and at least one other $C_2$ to $C_{10}$ α-olefin wherein
(c) the heterophasic propylene copolymer (HECO) is β-nucleated,
(d) the heterophasic propylene copolymer (HECO) has a melt flow rate $MFR_2$ (230° C.) measured according to ISO 1133 of below 1.0 g/10min, and
(e) said elastomeric copolymer (B) has an intrinsic viscosity measured in tetraline at 135° C. of equal or below 4.0 dl/g.

2. Heterophasic propylene copolymer (HECO) according to claim 1, wherein the heterophasic propylene copolymer (HECO) is partially crystallized in the β-modification.

3. Heterophasic propylene copolymer (HECO) according to claim 1, wherein the amount of β-modification of the heterophasic propylene (HECO) copolymer is at least 50%.

4. Heterophasic propylene copolymer (HECO) according to claim 1, wherein the xylene soluble fraction of the propylene matrix (A) is below 2.5 wt.-%.

5. Heterophasic propylene copolymer (HECO) according to claim 1, wherein the propylene matrix (A) is a propylene homopolymer.

6. Heterophasic propylene copolymer (HECO) according to claim 1, wherein the elastomeric copolymer (B) is unimodal.

7. Heterophasic propylene copolymer (HECO) according to claim 1, wherein the elastomeric copolymer (B) comprises propylene and at least one other $C_2$ to $C_{10}$ α-olefin selected from the group consisting of ethylene, 1-butene, 1-pentene, 1-hexene, 1-heptene and 1-octene.

8. Heterophasic propylene copolymer (HECO) according to claim 1, wherein the elastomeric copolymer (B) comprises ethylene.

9. Heterophasic propylene copolymer (HECO) according to claim 1, wherein the elastomeric copolymer (B) comprises propylene and ethylene as the only two α-olefins.

10. Heterophasic propylene copolymer (HECO) according to claim 1, wherein the elastomeric copolymer (B) has a propylene content of equal or below 70 wt.-%.

11. Heterophasic propylene copolymer (HECO) according to claim 1, wherein the elastomeric copolymer (B) is an ethylene propylene rubber (EPR).

12. Heterophasic propylene copolymer (HECO) according to claim 1, wherein the comonomer content of the heterophasic propylene copolymer (HECO) is below 20.0 wt.-% (comonomer/(comonomer+ propylene)).

13. Heterophasic propylene copolymer (HECO) according to claim 1, wherein the heterophasic propylene copolymer (HECO) has an impact strength measured according the Charpy impact test (ISO 179 (1 eA)) at −20° C. of at least 22.0 kJ/m².

14. Heterophasic propylene copolymer (HECO) according to claim 1, wherein the heterophasic propylene copolymer (HECO) has a flexural modulus measured according to ISO 178 of at least 1000 MPa.

15. Heterophasic propylene copolymer (HECO) according to claim 1, wherein the heterophasic propylene copolymer (HECO) is multimodal.

16. Heterophasic propylene copolymer according to claim 1, wherein the heterophasic propylene copolymer (HECO) is a coating layer of a pipe, in particular a steel pipe.

17. Use of a heterophasic propylene copolymer (HECO) according to claim 1 for pipes or parts of a pipes.

18. Use according to claim 17, wherein the pipe is a steel pipe or a multilayer pipe.

19. Use according to claim 17, wherein the heterophasic propylene copolymer (HECO) is used as a coating layer for pipes, in particular steel pipes, or as a layer in multilayer pipes.

20. Method for producing an heterophasic propylene copolymer (HECO) comprising the steps of
(a) polymerizing propylene and optionally further comonomer(s) to obtain a propylene matrix (A),
(b) polymerizing propylene and further comonomer(s) to obtain a elastomeric propylene copolymer (B), comprising propylene and at least one other $C_2$ to $C_{10}$ α-olefin
(c) mixing propylene matrix (A) and the elastomeric propylene copolymer (B)
(d) β-nucleating said mixture
wherein
(e) the heterophasic propylene copolymer (HECO) is β-nucleated,
(f) the heterophasic propylene copolymer (HECO) has a melt flow rate $MFR_2$ (230° C.) measured according to ISO 1133 of below 1.0 g/10min, and
(g) said elastomeric copolymer (B) has an intrinsic viscosity measured in tetraline at 135° C. of equal or below 4.0 dl/g.

21. Method according to claim 20, wherein the method comprises the steps
(a) polymerizing propylene and optionally further comonomer(s) in at least one reactor to obtain the propylene matrix (A)
(b) transferring said propylene matrix (A) in a further reactor
(c) polymerizing propylene and further comonomer(s) in the presence of said propylene matrix (A) to obtain the elastomeric propylene copolymer (B)
(d) β-nucleating said mixture.

22. A pipe, in particular steel pipe or multilayer pipe, comprising a heterophasic propylene copolymer (HECO) including
(a) a propylene matrix (A) and
(b) an elastomeric copolymer (B) comprising propylene and at least one other $C_2$ to $C_{10}$ α-olefin
wherein
(c) the heterophasic propylene copolymer (HECO) is β-nucleated,
(d) the heterophasic propylene copolymer (HECO) has a melt flow rate $MFR_2$ (230° C.) measured according to ISO 1133 of below 1.0 g/10min, and
(e) said elastomeric copolymer (B) has an intrinsic viscosity measured in tetraline at 135° C. of equal or below 4.0 dl/g.

23. Pipe according to claim 22, wherein the heterophasic propylene copolymer (HECO) is a coating layer of the (steel) pipe or a layer of the multilayer pipe.

* * * * *

UNITED STATES PATENT AND TRADEMARK OFFICE
CERTIFICATE OF CORRECTION

| | |
|---|---|
| PATENT NO. | : 8,586,163 B2 |
| APPLICATION NO. | : 12/734367 |
| DATED | : November 19, 2013 |
| INVENTOR(S) | : Bo Malm, Klaus Bernreitner and Franz Ruemer |

It is certified that error appears in the above-identified patent and that said Letters Patent is hereby corrected as shown below:

In the Specification

Column 1, Line 43, "olfin" should be --olefin--

Column 1, Line 47, "form" should be --from--

Column 1, Line 50, "thoughness" should be --toughness--

Column 2, Line 18, "presnet" should be --present--

Column 2, Line 20, "imparticular" should be --in particular--

Column 2, Line 35, "rat" should be --rate--

Column 2, Line 53, "rat" should be --rate--

Column 4, Line 54, "form" should be --from--

Column 6, Line 57, "Mpa" should be --MPa--

Column 6, Line 60, delete "a" between "of" & "pipes"

Column 7, Line 44, "aimount" should be --amount--

Column 8, Line 1, "matrial" should be --material--

Column 8, Line 34, "sterospecific" should be --stereospecific--

Column 10, Line 21, "acidsor" should be --acids or--

Column 12, Line 21, "rat" should be --rate--

Column 12, Line 22, add --1.0g/10min.-- after "below"

Signed and Sealed this
Second Day of September, 2014

Michelle K. Lee
*Deputy Director of the United States Patent and Trademark Office*

CERTIFICATE OF CORRECTION (continued)
U.S. Pat. No. 8,586,163 B2

Column 14, Line 44, "V" should be --v--

Column 15, Line 22, "w.-%" should be --wt.-%--